United States Patent [19]  
Simpson et al.

[11] Patent Number: 4,682,454  
[45] Date of Patent: Jul. 28, 1987

[54] STANDING SEAM ROOF ASSEMBLY COMPONENTS

[75] Inventors: Harold G. Simpson, Mustang; Leo E. Neyer, Edmond, both of Okla.

[73] Assignee: Harold Simpson, Inc., Oklahoma City, Okla.

[21] Appl. No.: 832,748

[22] Filed: Feb. 24, 1986

Related U.S. Application Data

[63] Continuation-in-part of Ser. No. 745,320, Jun. 14, 1985.

[51] Int. Cl.$^4$ .............................................. E04B 7/18
[52] U.S. Cl. ...................................... 52/200; 52/748
[58] Field of Search ............... 52/200, 202, 748, 199, 52/213, 747, 746, 208

[56] References Cited

U.S. PATENT DOCUMENTS

| 4,173,854 | 11/1979 | Wallerstein | 52/200 |
| 4,194,498 | 3/1980 | Mayerovitch | 52/200 X |
| 4,559,753 | 12/1985 | Brueske | 52/200 X |

FOREIGN PATENT DOCUMENTS 1352258  1/1964  France ........................ 52/200

Primary Examiner—Carl D. Friedman  
Assistant Examiner—Naoko N. Slack  
Attorney, Agent, or Firm—Bill D. McCarthy

[57] ABSTRACT

A post installation skylight assembly is presented in which a backup frame with an access opening is rested upon underlying secondary structural members prior to installation of a roof panel over and nesting with the backup frame, post removal of a medial position of the roof panel to expose the access opening, and positioning a translucent pane member over the opening frame to cover the access opening.

9 Claims, 14 Drawing Figures

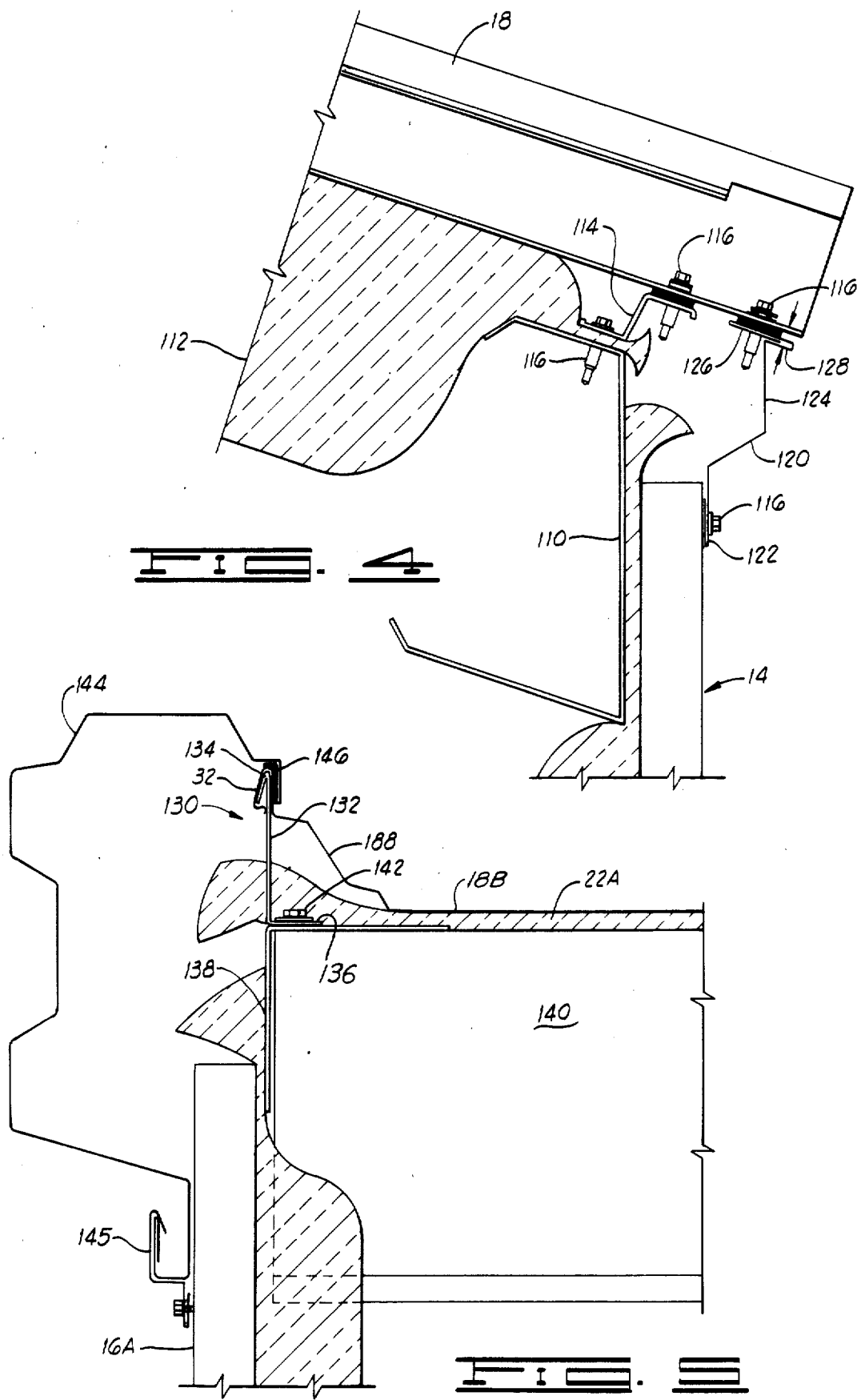

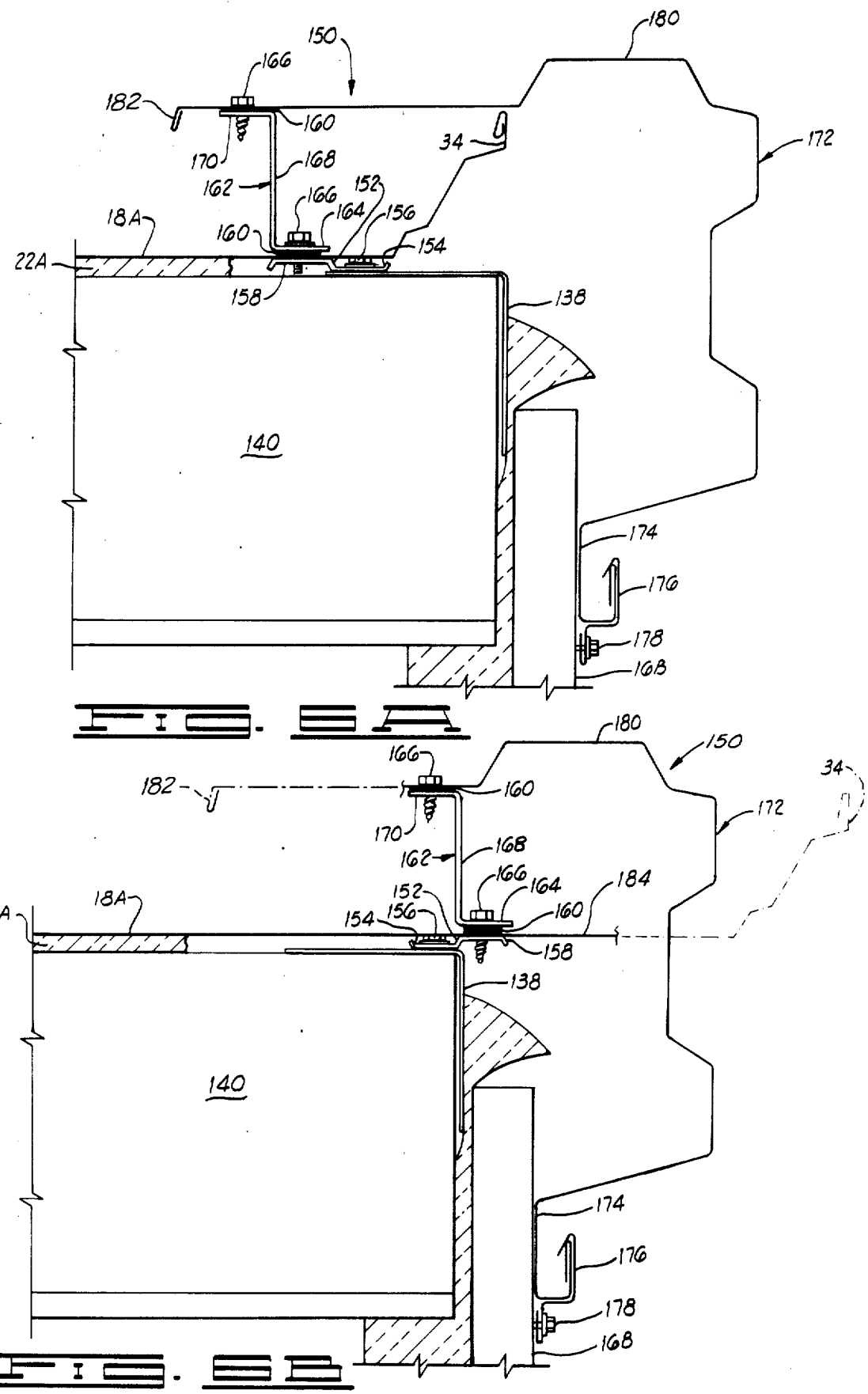

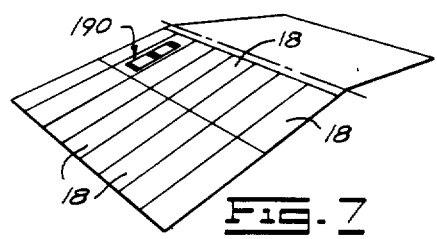
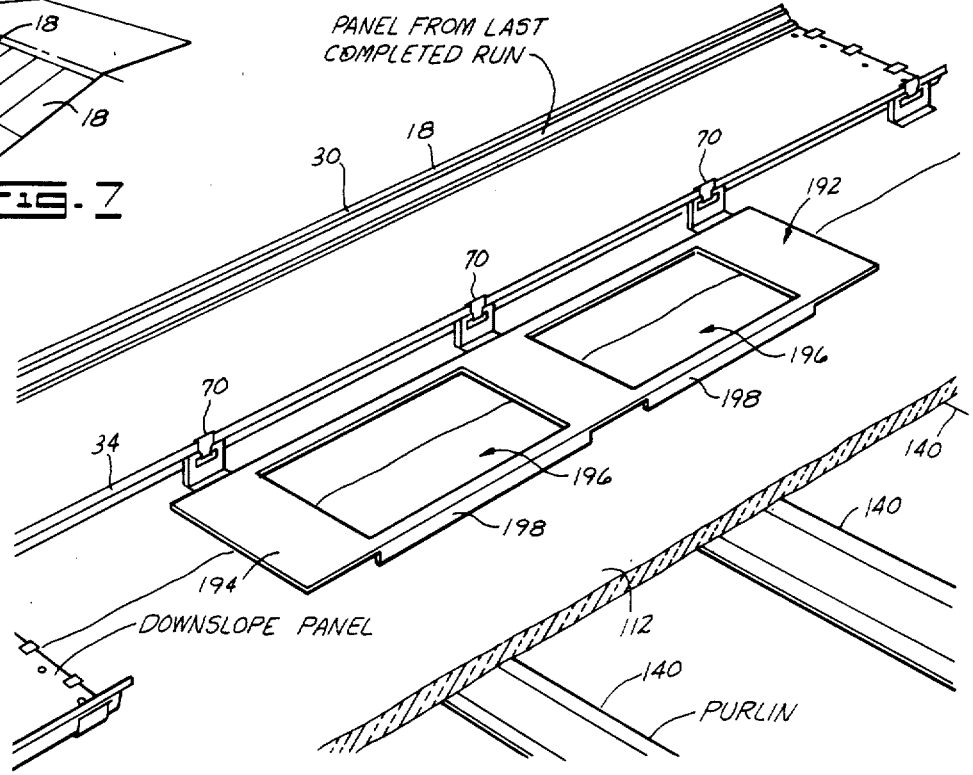
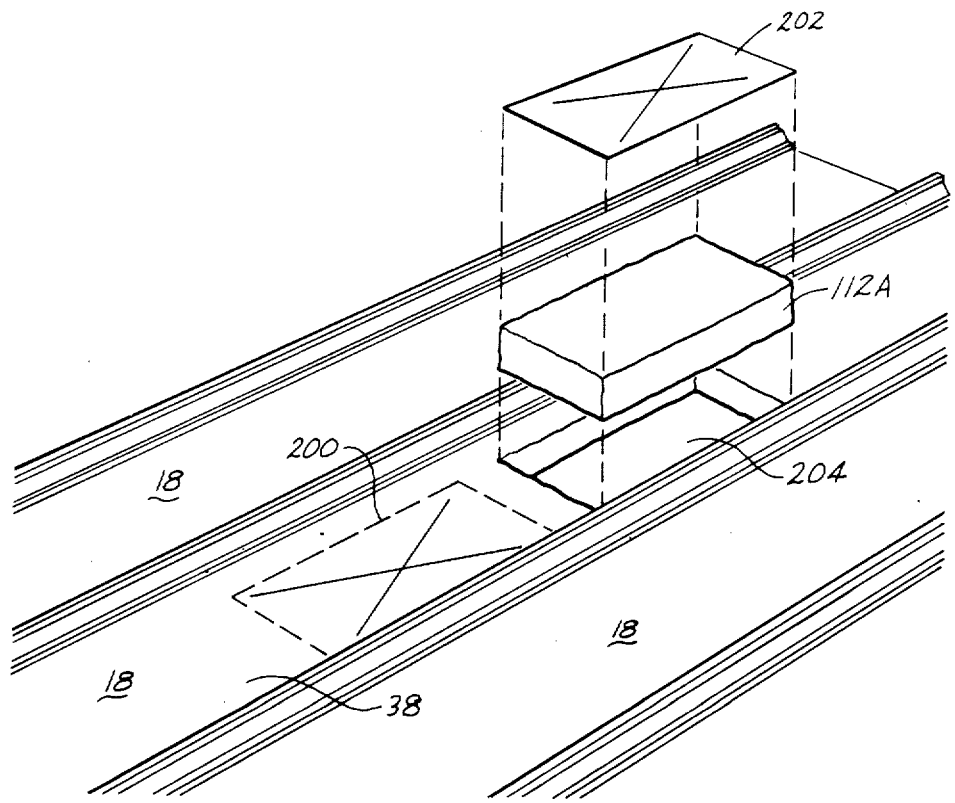

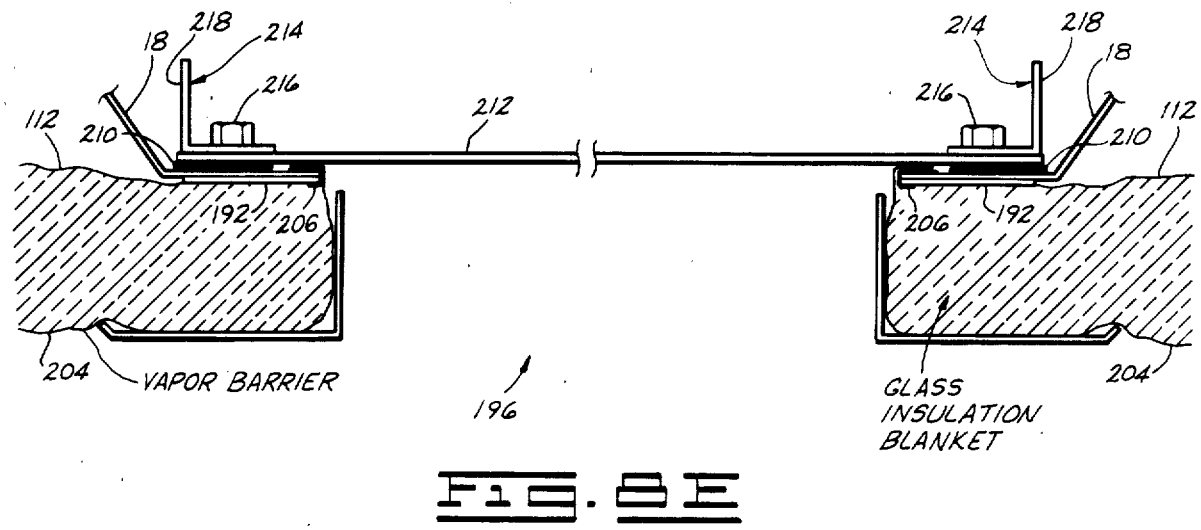

STANDING SEAM ROOF ASSEMBLY COMPONENTS

CROSS REFERENCE TO RELATED APPLICATION

This application is a continuation-in-part to U.S. application Ser. No. 745,320, entitled "Standing Seam Roof Assembly and Support Apparatus", filed June 14, 1985, pending.

BACKGROUND OF INVENTION

1. Field of the Invention

The present invention relates to standing seam roof assemblies, and more particularly but not by way of limitation, to improvements in components for a standing seam roof assembly and methods of installing same.

2. Brief Statement of the Prior Art

Specific problem areas in this field include the difficulty of designing a clip for standing seam roof panels that will resist uplift forces imposed on the clip while allowing the expansion and contraction movement between roof panels and their building supporting structurals. The clip tab should remain at the same position on the male side lap portion of the standing seam panel so that the sealant which is installed to provide a water seal between the top of the male apex of the male side lap portion and the sealant contained in the retaining cavity of the female side lap portion is not dislodged by differential movement of the clip tab and the male side lap portion. One approach to this is taught by Simpson and Holman in U.S. Pat. No. 4,497,151 wherein the clip tab tightly grips the male side lap portion by means of barbs that embed into the metal and prevent differential movement of the tab and the male side lap portion.

Another problem area involves the installation of the first run of panels on a standing seam roof system in that this must be accomplished so that the first panel is substantially true with the underlying secondary support structurals of the building. The reason for this is that the standing seam roof panels seam together continuously along their sides and there is no provision to overlap the panels more at one end of the panels than the other. The panels are relatively narrow so there is little opportunity to flex the panel by bowing or otherwise deforming the panel shape to overcome the angular track of a roof that is started out of alignment. Also contributing to the difficulty of correcting misalignment is the fact that the panel ends are usually factory punched and notched for attachment to each other at the ends and at the termination of the panels along the eave and the ridge. Thus, staggering of the panels to keep the ends in proper alignment can only be done to accommodate a very small amount of misalignment.

Most roof structurals are not square and true at the roof level even if they are at the ground level. This means that the starting edge of the first panel run will in many cases have to be established by measuring the structurals and establishing a start line that is independent of the skew of the structurals at the starting edge. This line is usually marked with a transit or chalk line along the top of the structural steel close to the end of the roof structurals.

The alignment problem is further complicated by the fact that the usual procedure is to install the underlying building insulation prior to installing the panels. The most common type of insulation in use is glass fiber blanket insulation with a vinyl vapor retardant on one side. The insulation is installed with the vapor retardant down and the glass fiber exposed from the top. The glass fiber in effect hides the structural system as far as observing the exact location of marks on the structurals is concerned. The spungy nature of the glass fiber blanket makes it difficult to precisely locate a clip, or angle member, such that the roof edge is in good alignment with the structural system. The glass fiber insulation also interferes with string lines to indicate the start location of the first panel run.

Another complicating design factor in developing a positive method of establishing the start location of the first panel run is the fact that the start attaching method must allow the roof panel to move longitudinally, independent of the structural system, for thermal expansion. Panel clips cannot be used as starters for most panel systems because most standing seam roof panels are installed with the male side lap portion as the leading edge; the panel clips are designed to attach to the male lip before the female side lap portion is seamed to the male side lap portion.

The termination rake detail for metal roof panels, where the roof panels are designed to expand and contract independently of their supporting structurals, has largely been left to the field erection crew. An exception is where the panel module is precisely controlled other than through the use of prepunched holes in the structural system. Another approach is the use of erection guides that require the erector to hold the panel within precise module.

Even when the erector is trying to hold the panel on module, it is generally not possible to guarantee the exact location of the male side lap portion of the roof panels when the end of the roof run is reached. For example, on a building that is 200 feet long: if the edge of a 26 gage panel—that is 3 inches higher than the panel flat and held in place by a clip fastened on top of a compressible blanket insulation—is allowed to be 1/32 inch too wide (1/32 inch increments not shown on construction tapes) then the cumulative growth of the panel edge over the length of the building would be more than 6 inches. The erector would usually discover this problem about 3 or 4 panels from the end of the panel run.

There are various methods for sealing the end of a panel slope to provide for expansion and contraction, but very few such methods will work if the panel is not on a precise module. The few that recognize this problem attempt to solve it by requiring extensive field bending or the use of a special width panel that may or may not be required to terminate the roof slope. These prior art solutions have obvious drawbacks in that the erector cannot wait to finish the roof while a few specially fabricated parts arrive without incurring additional costs and delays.

Another problem with most terminations of panel runs is the inability of the termination method to accommodate an out of square condition that inevitably occurs. This condition further complicates the design criteria which must accommodate the thermal expansion and contraction of the roof panels.

The installation of water resistant roof panels finds more difficulties at the eave rake detail of the roof system, especially for low sloped roof systems. Water running off the eave will run back under the roof panels for a distance of about 3 inches or more on a ¼ inch to 12 inches sloped roof. An eave flashing is used along the intersection of the roof panels and the wall members where a gutter is not desired either for appearance or because of severe icing conditions. This eave flashing provides two primary functions: it hides the intersection of the roof and the wall with an attractive finishing detail; and it can seal the edge of the roof from water entry if properly designed and installed.

The usual method of designing the flashing is to have the upper edge of the flashing rest between the roof panel and the eave structural member. This method is prone to allow water to backup behind the panel and the flashing because there is no known way to positively seal the end of two roof panels in the field so they will never leak. When water does leak between the flashing it must have some way to exit other than into the building. Some prior art flashings attempt to solve this problem but they do not cover the fastener used to attach the flashing to the roof panel or they ignore the necessity of holding the flashing in place until the fastener is installed through the roof.

One other problem to be dealt with in the present disclosure is that of providing water tight openings in the roof panels for utility assemblies such as skylights. In usual practice, panel installation must be periodically held up while the utility openings are framed, often by special crews while the paneling crew stands by. Even then such utility assemblies often are not water tight or quickly become such as they are usually mounted in a stationary position while the surrounding panel members flex and move relative thereto; thus, special flashings and sealants must be constantly renewed, resulting in costly maintenance upkeep, not to mention unsightly roofing details.

SUMMARY OF THE INVENTION

The present invention presents an improved standing seam roof assembly in which elongated metal panels are interlockingly disposed in side edge to side edge sealing engagement to form a roofing envelope of a building structure. Each of said panels has a standing seam lap portion along each side edge with a medial pan portion therebetween, the standing seam lap portion along one side edge being an upwardly directed female side lap portion and the standing seam lap portion along the other side edge being an upwardly directed male side lap portion, with the male side lap portion being sealingly received in the retaining cavity of an adjacent panel's female side lap portion, with the outer side edges being disposed for dimensional floating freedom for facilitating proper standing seam joint alignment.

Also presented herein is an improved clip assembly having a clamping tab with an upstanding hooking portion which is engageable over the male apex of the male section, and the clip assembly has a male base abutting portion. The clamping tab is configured to lockingly engage the panel male section between the hooking portion and the male base abutting portion so that the clamping tab is attached to the panel male section so as to be maintained in a stationary location thereon. A clip base member is supportable on underlying structure and slidingly supports the clamping tab in a direction substantially parallel to the male panel while permitting substantially unrestricted uplift of the clamping tab within a predetermined range of lift.

Further, the present invention teaches various improvements in the initial row installment of roofing panels, together with an improved flashing apparatus therefor. Another feature herein is an improved edge termination trim apparatus which lessens the criticality of module expansion effect on panel placement.

Finally, taught herein is an improved utility or skylight assembly and a method of installing same in which a skylight assembly or the like is installed after the panels have been installed, thus reducing interference with roofing crews during their panel installation activities.

It is an object of the present invention to provide an improved standing seam roof assembly having favorable sealing and installing characteristics.

Another object of the present invention is to provide an improved standing seam joint clip which permits relatively unrestricted sliding movement between a roof panel and underlying structure while affording a predetermined restraining uplift movement to the panel.

Other objects are to provide improved installing methods for the standing seam roof assembly taught herein.

Further, an object is to provide improved eave flashing for facilitating placement of a roof panel over a vertical wall assembly, as well as to provide improved edge termination trim apparatus for the same object.

Finally, an object of the present invention is to provide an improved utility assembly which permits post panel installation complete with minimum interference with panel installation.

Other objects, advantages and features of the present invention will become apparent from the following detailed description of construction details of preferred embodiments of the present invention when read in conjunction with the appended claims and the included drawings.

BRIEF DESCRIPTION OF THE DRAWINGS

FIG. 4 is a semi-detailed diagrammatic representation of an eave trim detail of the present invention.

FIGS. 6A and 6B are semi-detailed diagrammatical representations of one embodiment of a termination rake detail of the present invention. FIG. 6C is a similar representation of another embodiment thereof.

FIG. 7 is a legend representation in perspective indicating a selected location of a skylight opening.

FIGS. 8A through 8D are isometric representations of a skylight assembly installation of the present invention. FIG. 8E is a side elevational, cross-sectional view of the skylight opening following installation.

DISCUSSION

Figure 1:
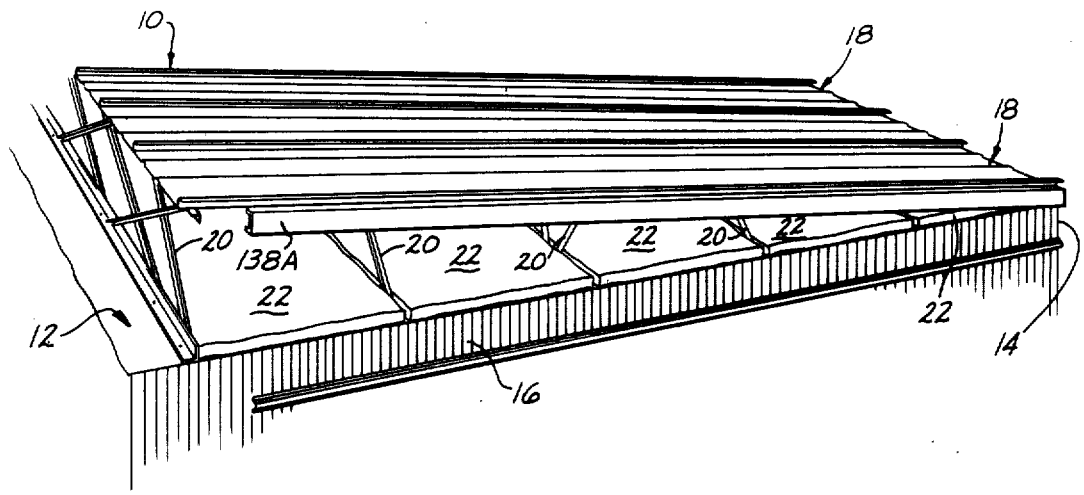
FIG. 1 is an isometric partial view of a standing seam roof assembly of the type considered in the present invention disclosure.

The relative importance and nature of many factors which affect the design and installation of a standing seam roof vary considerably. Such attributes as strength, watertightness, costs, durability and aesthetics, by way of examples, are affected by roof slope, geographic area, building occupancy, length of panel run, extent and types of inwardly and outwardly directed force loadings, span dimensions, type of insulation, vapor control requirements and other factors which relate to the manufacture, packaging and erection of the roof system.

Functional type standing seam metal panel roof systems are usually installed on relatively flat building slopes, so such systems must be capable of resisting leaking when water accummulates on, or is blown against, the roof panel seams. It is the usual practice to minimize the number of the overlapping joints, since such joints are difficult to make watertight, and the long panel runs encountered these days make it imperative that panel attachment to supporting structural members accommodate panel expansion and contraction caused by changing ambient temperatures.

Panel attaching methods usually involve some type of a floating clip which permits a degree of longitudinal movement to accommodate the environmental expansion/contraction movements of the attached panels. Many prior art clips addressing this problem have been taught, and these known clips have met with varying degrees of success. Not only must such clips perform their required function, factors such as design simplicity, manufacturing cost and installation ease dictate a continuing search for better clip designs, an object undertaken and met by the present invention.

Further complicating the installation of standing seam roof systems, in addition to installing the expansion clips just mentioned, the insulation batting utilized with these roof systems, in most cases, is placed over the underlying structural members and beneath the newly installed roof panels. While this provides ease of insulation placement, it complicates panel support and attachment. The very existence of the layered insulation hides the structural members from the immediate view of a worker on top of the panels being installed.

The usual design practice is for a standing seam clip to attach only to the male portions of the metal roof panels, and not to the companion female portions that cooperate with the male portions to form the standing seam joints. That is, the female portion of a joint is not restrained directly, but is held in place by its locking engagement with the male portion of the joint. This mutual interconnection and cooperative restraint of male and female portions tends to unravel when forces are applied in uneven distributions, such as by wind uplift or by localized weight loads such when individuals walk on the roof panels. The present invention seeks to minimize these difficulties by an improved standing seam joint configuration and by a standing seam clip assembly which resists such unraveling forces.

The importance of the above will become clear with regard to the present invention when considered in light of the following description of the preferred embodiments thereof. Referring to the drawings, and more particularly to FIG. 1, shown therein is a portion of a new standing seam roof system 10 supported on a preexisting roof 12 of a building structure 14. As described more fully in U.S. patent applicaton Ser. No. 745,320, filed June 14, 1985 by the present inventors, the preexisting roof 12 can be any preexisting roof structure, such as a built-up roof, which is connected to and supported by conventional primary and secondary structural systems (not shown), and a plurality of wall panels 16. The primary structural system of the building structure will usually consist of a plurality of upwardly extending column members which are rigidly connected to a foundation and a plurality of primary beams which are more or less horizontally disposed and supported by the column members. The secondary structural system will usually consist of a number of purlin or joist members supported by the column members or other primary beams.

While the present invention is not restricted to use in re-roofing installations, and will be equally applicable to new installations, it is convenient to illustrate its application in the field of re-roofing in FIG. 1, as such is an increasingly more important segment of the building industry. The roof system 10 will generally be formed of a plurality of roof panels, such as designated by the numeral 18 in FIG. 1. The roof panels 18 are interconnected at their sides to provide a roof plane for the roof system 10, and while generally flat panels (except for joints and stiffener corrugations) are depicted in FIG. 1, it will be understood that the present invention is also usable with curved panels such as is sometimes preferred by architectural planners.

In the re-roofing installation illustrated in FIG. 1, the roof panels 18 are supported by a plurality of roofing support spacers 20 which spatially dispose the roof panels above the preexisting roof 12. Disposed upon the preexisting roof 12 may be additional insulation 22, which in re-roofing, is usually placed directly on the preexisting roof, as shown, prior to the attachment of the roof panels 18 to the support spacers 20. Of course, for new installations, it is well known to dispose the insulation 22 directly over the purlins or joists, and it is general practice to attach the roof panels 18 directly to these secondary structural members with the insulation pinched therebetween. Of course, it is also possible to use various bracketing devices to interconnect the panels and underlying structural members. In any event, the side edges of the roof panels 18 are held to the supporting structural members via roof clips, an improved version of which will be described hereinbelow as part of the present invention.

Figure 2:
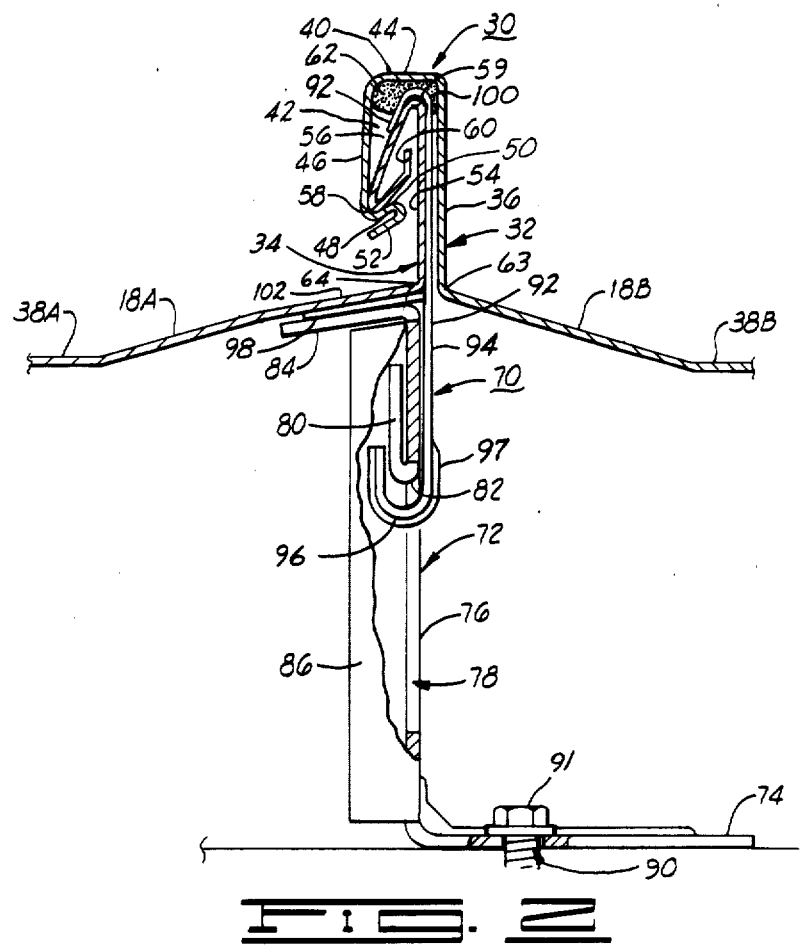
FIG. 2 is an elevational view in partial cutaway cross section of a standing seam joint constructed in accordance with the present invention.

Depicted in FIG. 2 is a profile view of the side lap edges of a pair of adjacent roof panels 18A and 18B, identical in construction to the aforementioned roof panels 18, which interconnect to form a standing seam joint 30. A standing seam side lap portion 32 is an upwardly directed female side lap portion along one side edge of panel 18B, while a side lap portion 34 is an upwardly directed male side lap portion along one side of panel 18A. The female and male side lap portions 32, 34 are depicted in interlocked relationship, together forming the standing seam joint 30.

The female side lap portion 32, along one longitudinal edge of the roof panel 18B, has a first female leg portion 36 extending upwardly from a medial pan portion 38B. A second female leg portion 40 extends from the first female leg portion 32 to form an insertion or retaining cavity 42 therebetween. The second female leg portion 40 has an upper flat portion 44 and a downwardly extending leg 46 which is crimped to form a distal leg portion 48 which is folded and bent at an upward angle relative to the medial pan 38B. The distal leg portion 48 forms a nesting cradle 50 and has a generally downwardly directed free leg 52 which is one side edge of the roof panel 18B. Thus, the roof panel 18B has an unrestricted free side edge represented by the free leg 52.

While the male side lap portion 34 extends along one longitudinal edge of the roof panel 18A, it will be understood that an identically constructed male side lap portion extends along the opposing longitudinal edge of the roof panel 18B; however, for the purpose of illustrating the interlocking standing seam joints formed as the roof panels 18 are installed, the mating side edge of roof panel 18A is depicted in FIG. 2 as the second portion of the standing seam joint 30, a description of the male side lap portion 34 will also described the opposite longitudinal edge of the roof panel 18B.

The male side lap portion 34 has a first male leg portion 54 extending upwardly from medial pan portion 38A of the roof panel 18A. A second male leg portion 56 extends from the first male leg portion 54 generally downwardly and has a crimped portion at its lowest end to form a nesting apex 58 at the lower most point of the second male leg portion 56, the first and second male leg portions 54, 56 forming an uppermost male apex 59. The male side lap portion 34 is received in the retaining cavity 42 of the roof panel 18B such that the nesting apex 58 is engaged by the nesting cradle 50 so as to resist disengagement or unravelling of the component members of the standing seam joint 30. The crimped portion of the second male leg portion 56 has a generally upwardly directed free leg 60 which is spatially disposed from, and generally parallel to, the first male leg portion 54 in its rest mode, and serves as an abutting portion as discussed below, during assembly. The free leg 60 is one side edge of the roof panel 18A, and as mentioned above for the free leg 52 of the roof panel 18B, provides an unrestricted free side edge of the roof panel 18B. A sealant 62 is disposed in the retaining cavity 42 for sealing engagement between the female and male side lap portions 32, 34.

As the male side lap portion 34 is inserted into the female side lap portion 32 to form the standing seam joint 30, these members springingly deform as follows. As the distal leg portion 48 of the female side lap portion 32 is engaged by the downwardly extending second male leg portion 56, both such members are caused to move, with the downwardly extending leg 46 and upper flat portion 44 of the second female leg portion moving to open the access passage to insertion cavity 42. Simultaneously, the second male leg portion 56 is caused to move toward the first male leg portion 54, but this movement is limited by the amount of gap between the upwardly extending free leg 60 and the first male leg portion, because the folding movement of the second male leg portion 56 will be stopped as the free leg 60 is brought against the first male leg portion 54. This feature of the present invention permits the male side lap portion 34 to absorb a portion of the required temporary deformation of the joint metals during insertion, while at the same time positioning the nesting apex 58 of the male portion to be favorably positioned to snap into the nesting cradle 50 of the female portion. Thus, a superior and more positive snap together action occurs when inserting the male side lap portion 34 into the female side lap portion 32, with the nesting apex 58 more firmly seated in the nesting cradle 50.

The extreme side edge portions of each roof panel 18 is caused to be disposed by the roll forming process (that forms metal into the desired corrugated profile) at the positions of the free legs 52 and 60 in FIG. 2. As described above, the free leg 52 (of the female side lap portion 32) and the free leg 60 (of the male side lap portion 34) are disposed to be free of involvement in the functional activities of the standing seam joint 30 after the joint 30 is assembled, so as to make their dimensional attributes noncritical. This is an important contribution of the present invention in that it affords greater forming precision in the roll forming process, leading to increased dimensional control of the panel shape during its roll forming. While this is discussed more fully hereinbelow, it is common to gage off one edge of the metal being formed, but with the camber and other dimensional irregularities found in steel coils, continuous edge engagement is difficult if not impossible in practice. Instead of using one of the side edges of the metal as a dimension datum line, the snap together portions on each side of the panel, that is, the male and female side lap portions, are gaged on roll formed radii, such as the radii numerated 63 and 64 in FIG. 2. This allows greater precision in controlling the location of the snap together points than otherwise is possible, since radii are more easily controlled by roll forming than when using the metal edges. Dimensional deviations are easily absorbed by the free floating outer edges represented by the free legs 52 and 60.

The overlapping and interlocking roof panels 18 of FIG. 1 are attached to the underlying support spacers 20 (or to purlins, etc., depending upon the particular roofing installation at hand) by means of an improved standing seam joint clip assembly 70 which is shown in side elevational, partial cutaway view in FIG. 2 hooked over to the male side lap portion 34 of the roof panel 18A. A front elevational view of just the clip assembly 70 appears in FIG. 3.

The clip assembly 70 has a clip base member 72 with a lower flange portion 74 and an upwardly directed support flange portion 76 extensive therefrom as shown. The slip base member 72 has a window opening 78 through its support flange created by cutting and removing a portion of its web, with a rolled portion 80 bent upward so as to form a track 82 along its lowermost portion and disposed at the uppermost edge of the window opening 78. An upper portion of the support flange 76 is shaped to form a support platform 84, and side portions of the support flange 76 are formed as side tabs 86 which serve to reinforce the web (one of the tabs 86 being partially cutaway in FIG. 2 for clarity). Plural reinforcing ribs such as at 88 can be embossed in the clip base member 72 to strengthen it. Disposed between these ribbings are plural apertures 90 in the flange portion 74 for attachment via appropriate screws 91 to an underlying support member.

The clip assembly 70 also has a clamping tab member 92 which has a body portion 94 having a rolled bottom portion configured to extend through the window opening 78 in the form of a sliding hook 96 which is loosely disposed over the track 82 of the support flange 76. The clamping tab member 92 has a plurality of strengthening ribs 97 which importantly add beam strength to the sliding hook 96 to prevent it from being opened up during extreme uplifting forces, thereby assuring continuous engagement of the sliding hook 96 over the track 82.

Figure 3:
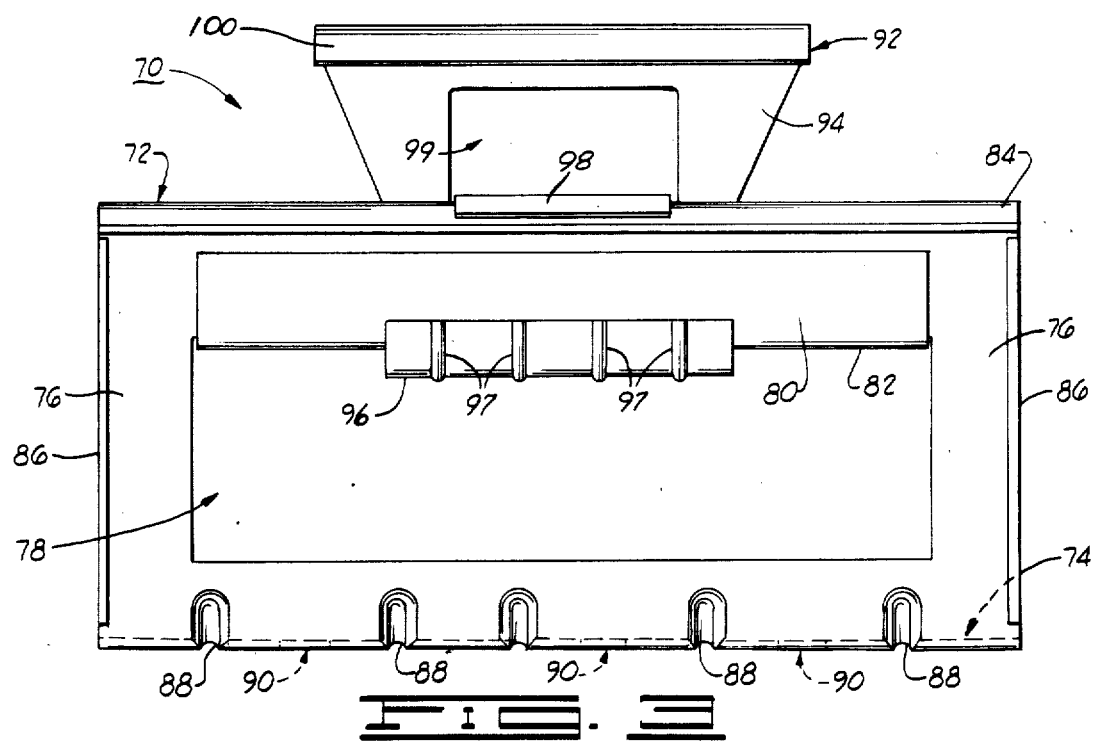
FIG. 3 is an elevational view of a clip assembly of the present invention.

The clip body portion 94 also has an extending tab member 98 which is also referred to herein as a male base abutting portion, and as shown in FIGS. 2 and 3, is angularly disposed to rest upon the support platform 84 of the support flange 76. This tab member 98 can be cut from the medial portion of the body portion 94 and bent into the position shown, leaving a free opening 99 in the body portion. The dimensions of the clamping tab member 92 are established such that it is captured in the position depicted in its rest mode, but can be raised an amount provided by the clearance between the lowermost point of the track 82 and the inner radius of the sliding hook 96. As will become clear below, this arrangement permits near frictionless sliding of the clamping tab member 92 along the track 82 within the dimensional confinement of the window opening 78 while also permitting substantially unrestricted uplift movement of the sliding hook within a predetermined range of lift predetermined by the dimensional slack afforded.

The upper portion of the clamping tab member 92 forms an upstanding hooking portion 100 which is engageable over the male apex 59 of the male side lap portion 34 as depicted in FIG. 2. Also, when the hooking portion 100 is placed over the male apex of the male side lap portion 34, the dimensions of the clamping tab member 92 are predetermined so that the tab member 98 is positioned just below a lowermost base portion 102 of the male side lap portion 34. This can be achieved by either relative rolling movement of the panel 18A and clamping tab member 92, or alternatively, the upper hooking portion 100 can be formed over the male apex 59 during installation with a conventional roll former having an appropriately shaped roll anvil to conform the over lap properly. In sum, once hooked over the male side lap portion 34, clamping tab member 92 is intended to remain affixed thereto and to move therewith as the roof panel 18A moves by reason of its thermal expansion or wind uplift. The clamping tab member 92, itself slidingly restrained by its respective clip base member 72, permits unrestricted travel of the roof panel 18A so long as such travel takes the clamping tab member through its permitted range of travel and lift, and once these limits are reached, securing restraint is exerted on the roof panel 18A (and thus on the interlocked roof panel 18B) by the clip assembly 70.

Turning now to FIG. 4, shown therein is another improvement in roofing systems presented by the present invention. FIG. 4 is a representation of an eave trim detail, that is, the detail at the overhang of the roof panels 18 where their lower ends overhang the wall 14. In a metal building assembly, the wall 14 typically will be comprised of plurality of corrugated wall panels attached to cross members often referred to as girts (not shown). As depicted in FIG. 4, the terminal roofing support member will often be a generally channel member (having a generally C-shaped cross section) which is represented as an eave strut 114. Roofing insulation may be placed on the preexisting roof such as represented by the insulation 22 in FIG. 11, but it also may be placed over the support members as depicted by roofing insulation 112 in FIG. 4. In any event, a clip or support member 114 is secured to the top of the eave strut 110 via screw fasteners 116 or the like, and similarly, screw fasteners 116 are used to secure the roof panels 18 to the support member 114.

The above describes a typical eave overhang, and various means have been devised to provide an eave gap cover which is easy to install, attractive and functionally acceptable from the viewpoint of providing an adequate seal. The present invention comprises an eave flashing member 120 (a metal sheet metal member shown in cross section profile) which has a flashing lower portion 122 configured to be disposed flush against the corrugations of the wall 14 and secured thereto via screw fasteners 116 or the like. Also, the eave flashing member 120 has a flashing upper portion 124 extending upwardly from the lower portion 122 sufficiently to be spatially juxtapositioned to the underside of the overhang of the roof panels 18 as shown.

Before the eave flashing design of the present invention, it has been difficult to interconnect the flashing and the roof panels since screw fasteners tend to dimple or even crush these relative thin members, and even when the connecting screws penetrated the roof panel, they tended to push the underlying flashing away from the panel as the screws were advanced. In the present invention, the flashing upper portion 124 supports or is formed into the shape of a flashing nut plate 126 which is configured to be substantially flush against the flat of the underside of the roof panels 18; that is, the flashing nut plate 126 is angularly disposed to be flush with the underside of the roof panel overhang and has a lip portion 128 that is disposed adjacent the lower ends of the roof panels. Sealant is preferably placed along the top surfaces of the eave strut 114 and the flashing nut plate 126 so as to be disposed sealingly engaged by the undersurface of the roof panel 18, as shown.

For interconnecting the lower end of the roof panel 18 and the eave flashing member 120, a workman need simply use gripping pliars (not shown) to squeeze the lip portion 128 of the flashing nut plate 126 against the undersurface of the roof panels 18 while interconnecting same by installing plural screw fasteners 116 therealong. The lip portion 128 provides the capability for temporary pressing together forces (represented by the opposing arrows in FIG. 4) to be applied without incurring crushing or bending damage during interconnection via the screw fasteners 116, and once these are installed, the temporary securing forces are removed. Of course, sealing of the corrugations of the roof and wall panels can be accomplished in conventionally known fashion to complete the eave sealing.

Another improvement to roofing systems presented herein involves a method of locating the initial edge row roofing panels which will be described with reference to FIG. 5, a representation in profile of a starting rake detail for a preengineered building system. The difficulty encountered at the edge row is that of installing the first panels that extend longitudinally along the edge of the building. The usual practice is that the building manufacturer requires the installing contractor to erect the components of the building so as to achieve near perfect squareness of the end wall with the side wall, a circumstance that for all practical purposes never happens. In reality, installing crew members have developed several methods of compensating for the lack of perpendicularity of the end wall members relative to the side wall members, most of which involve extending wire datum lines which are positioned by means of various measuring techniques. However, great difficulty is often encountered due to the precarious footing available at the elevated roof edge, and this condition is exacerbated by wind and other environmental influences; also, the layers of insulation batting is usually in place and largely hide the underlying structural members, so the wire datum lines must be disposed above the insulation in such prior art techniques, leaving most other guides inaccessible to the view of the worker as well.

Figure 5C:
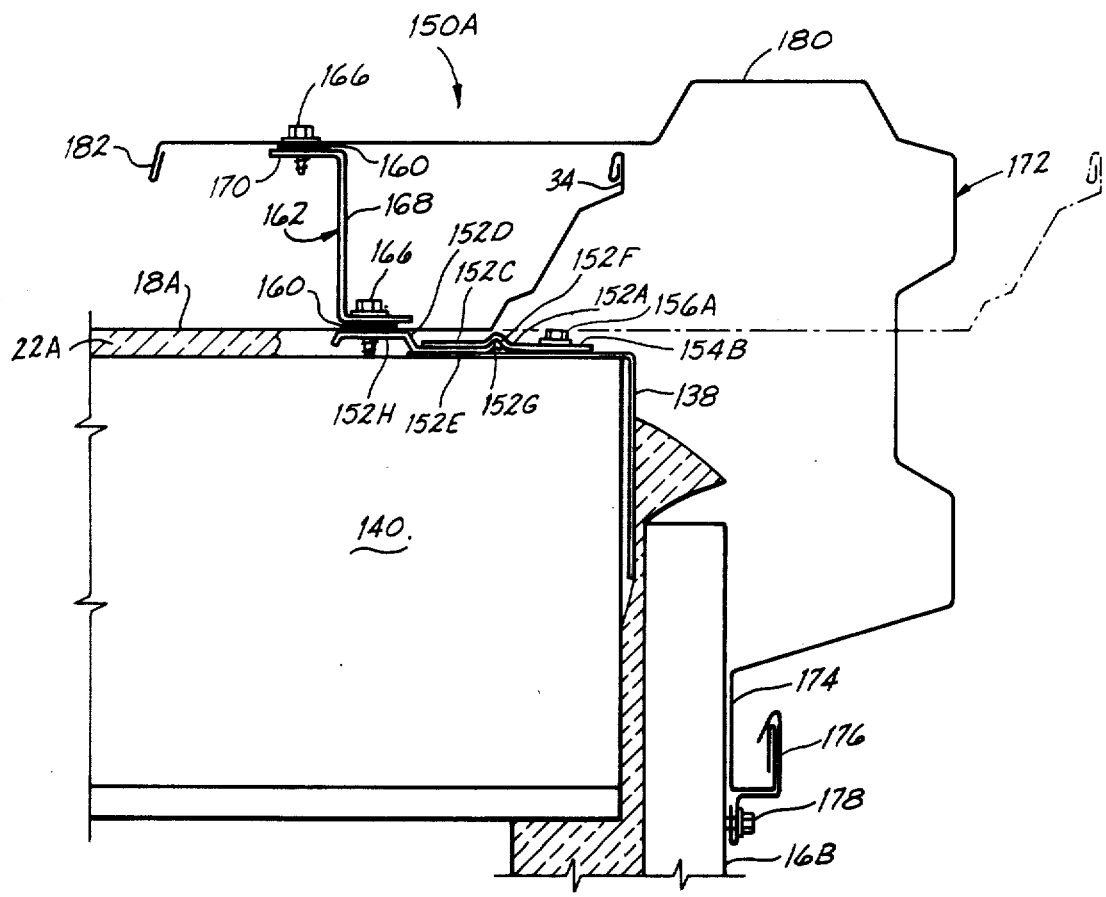
FIG. 5 is a semi-detailed diagrammatical representation of a starting rake detail of the present invention.

The present invention also provides for the placement of start clips 130 as shown in FIG. 5 along the starting end edge of the underlying roof support structurals. Each start clip 130 is configured to have an upwardly extending leg portion 132 which has an upper crimped portion 134 which is shaped like the male apex 59 of the male side lap portion 34 described above for the roof panel 18B so as to be lockingly received in the insertion cavity 42 of the roof panel 18A in the manner shown in FIG. 5. A base portion 136 extends normally to the leg portion 132, and the start clip 130 is secured to the usually provided edge angle member 138, which extends along the edges of the roof support structurals, represented by a purlin 140 in FIG. 5. Fasteners 142 which extend through holes in the base portion 136 attach the start clip 130 to the edge angle 138. Thermal expansion of the roof panels 18 is accommodated by the relative sliding of the start clips 130 and the female side lap portion of the roof panel. The edge angle member 138 defines the starting edge for placement of the roof panels to be disposed over the roof support structurals, and will usually extend from the eave to the ridge. In a re-roofing installation, the edge angle member 138 would be attached to the ends of the support spacers 20 as depicted by edge angle member 138A in FIG. 1.

In operation, once the edge angle member 138 is secured in place to form the starting edge of the roof, a chalk line is stretched along the end angle member and a datum line is marked on the top surface thereof. The positioning of the chalk line is accomplished in any desirable manner so as to dispose it perpendicularly to the side wall members. Once the datum line is marked, the chalk line is removed and a plurality of start clips 130 are secured along the datum line via screw fasteners 142. This provides an accurately positioned row of such start clips whose location is independent to the squareness or perpendicularity of the end wall 16A. Once the start clips 130 are in place, the insulation batting 22A is placed over the purlins 140, as shown, with the start clips 130 exposed to extend above the top of insulation. With the insulation 22A in place, the roof panels can be started. In FIG. 5, the female side lap portion 32 of the roof panel 18B is shown lockingly disposed over the upper crimped portion 134 of the start clip 130.

Next, an end flashing 144 is secured to cover the seal end wall gap in the manner shown, preferably with sealant 146 disposed to seal between the roof panel 18B and the start clip 130, and a plurality of screws (not shown) are set through the overlapping portion of the end flashing 144 and the female side lap portion of the roof panel 18B, the screws selectively being positioned to miss the start clips 130. A rake flashing clip 145 is attached to the end wall 16A and the lower portion 148 of the end flashing 144 is shaped to be secured therein. The configuration of the medial portion of the end flashing 144 is optional, and is usually determined to enhance the aesthetics of the end wall.

Turning now to FIGS. 6A and 6B, depicted therein is another feature of the present invention, a termination trim apparatus 150. In the assembly of a preengineered building, it is common to predetermine the location of the outer side edge of the terminal row of roof panels and to cover the edge with an edge termination trim or flashing member. In practice, the roof panels frequently do not stay on module, that is, the width of the individual roof panels tend to contract or expand, and the accumulated dimensional drift that results can cause the final resting location of the outer edge to vary considerably from the design specifications. Further, variations in underlying supports or strut members can exacerbate this dimensional drift, the consequence of which is most severely experienced along the termination rake details of the roof.

In FIG. 6A, another edge angle member 138 is supported along the ends of the purlins 140 in the manner discussed above for the start rake detail of FIG. 5 to form a building termination edge. The roof panel 18A is depicted as extending such that its male side lap portion 34 appears in the vicinity of the terminal edges of the purlins 140. In prior art practice, the termination trim flashing would be altered so as to hit, or contact, this corrugation, in contradistinction to the present termination trim apparatus which is designed to always miss, or avoid contacting, this termination panel corrugation. The insulation 22A will usually extend somewhat beyond the terminal edge of the purlins 140, but in FIGS. 6A and 6B this insulation is partially removed to show the termination trim apparatus 150 more clearly.

As shown, a termination plate 152 is provided which has a pad portion 154 supportable on the edge angle member 138 and attachable thereto by one or more screw members 156 which extend through slots (not shown) in the pad portion 154 to accommodate thermal expansion of the panel 18A. The termination plate 152 also has a panel support portion 158 which extends from the pad portion 154 and which is extendable by selective rotation of the pad portion prior to attachment to the edge angle member 138 in a direction which is either towards the terminal row of roof panels 18A, as shown in FIG. 6A, or in a direction away from the terminal row (as shown in FIG. 6B). This rotational feature of the termination plate 152 affords latitude in placement of the panel support portion 158 for the purpose which follows. The termination plate 152 can extend continuously along the end wall 16B from eave to ridge to support the roof panels 18A in the manner shown.

The roof panels 18A which form the terminal row of roof panels along the terminal edges of the purlins 140 (or of the support spacers, as the case may be) overlay the panel support portion 158 of the termination plate 152. A strip of tape sealant 160 is extended from eave to ridge along the top surface of the roof panels 18A just above the panel support portion 158. A longitudinally extending termination member 162, having a lower flange 164, is set upon the sealant 160 and secured thereon via plural screw members 166 which extend through the roof panel 18A and attach to the underlying panel support portion 158, sealingly squeezing the sealant 160 therebetween.

The termination member 162 is preferably a light gage, zee-cross sectioned member having a web portion 168 extending upwardly from the lower flange 164 and having an upper support flange 170 extending generally parallel to the lower flange 164. Another strip of tape sealant 160 is extended from eave to ridge along the top surface of the upper support flange 170, and a sheet metal termination flange 172 is disposed to overlap same. The termination flange 172 has a flashing lower portion 174 configured to be disposed substantially flush against the end wall 16B and retained thereat via a rake flashing clip 176 attached via screw members 178 to the wall 16B. The termination flange 172 also has a flashing upper portion 180 which is configured to extend over the side lap portions 34 of the terminal row of roof panels 18A, a termination lip 182 of the flashing upper portion 180 disposed to overlap and attach to the upper support flange 170 of the termination member 162. A plurality of screw members 166 connect the termination lip 182 to the upper support flange 170 in sufficient tightness to be sealed by the tape sealant therebetween. The cross sectional shape of the termination flange 172 outboard to the purlins 140 is preferably determined to match that of the end flashing 144 at the other end wall 16A for aesthetic reasons.

The discussion of termination trim 150 shown in FIG. 6A has been premised on the circumstance that the pair of side lap portions of the terminal row of roof panels 18A are finally disposed at or near the terminal edges of the purlins 140 such that the termination flange 172 will cover such. In practice, the final disposition of the side lap portions 34 can vary widely, and can in fact extend beyond the envelope interior of the termination flange 172 as depicted in FIG. 6B, wherein the side lap portion 34 (depicted in phantom lines) would extend outside of the termination flange 172, in which case the roof panels 18A is field-cut such that its newly formed terminal edge 184 falls within the interior envelope of the termination flange 172. The termination plate 152 can again be located as shown in FIG. 6A, or should the corrugation of the off module roof panel 18A interfere with such location, the termination plate 152 can be rotated and located at the outer edge of the edge angle member 138 as shown in FIG. 6B. The termination member 162 is secured to the underlying panel support portion 158 in the position shown. Also, the flashing upper portion 180 is trimmed back as required so that the termination lip 182 is removed. The tape sealant 160 is disposed between the trimmed edge 182A and the upper support lip 170, and a plurality of screw members 166 are inserted thereat.

Thus it will be clear that the termination flange 172 of the present invention provides flexibility and ease of erection for the termination rake detail in the assembly of the roof assembly unknown in the prior art. It presents an adaptable and attractive solution to the varied conditions encountered at this edge trim station, one which will be appreciated by installing workmen who must apply their skills in often wind blown conditions many feet above the ground.

FIG. 6C depicts another embodiment of the termination trim detail of the present invention and is numerated 150A. Since the termination trim apparatus 150A has substantially the same components as the termination trim apparatus 150, with the exceptions noted, the same numerals are used in FIG. 6C as appropriate. In FIG. 6C the edge angle member 138 is supported along the ends of the purlins 140 in the manner discussed above for the start rake detail of FIG. 5 to form a building termination edge. The roof panel 18A is depicted as extending such that its male side lap portion 34 appears in the vicinity of the terminal edges of the purlins 140. The insulation 22A will usually extend somewhat beyond the terminal edge of the purlins 140, but in FIG. 6C this insulation is partially removed to show the termination trim apparatus 150A more clearly.

As shown, a first termination plate 152A is provided which has a pad portion 152B supportable on the edge angle member 138 and attachable thereto by one or more screw members 156A which fasten through to the underlying purlin 140. The termination plate 152A also has an overlapping plate portion 152C which extends from the pad portion 152B and which is extendable by selective rotation of the pad portion 152B, prior to its attachment to the edge angle member 138, in a direction which is either towards the terminal row of roof panels 18A, as shown in FIG. 6C, or in a direction away from the terminal row. This rotational feature of the termination plate 152A affords latitude in placement of the overlapping plate portion 152B for the purpose which follows. The termination plate 152A can extend continuously along the end wall 16B from eave to ridge, or a plurality of termination plates can be selectively disposed along the edge angle member 138 to support the roof panels 18A in the manner shown.

A second termination plate 152D is provided having a pad portion 152E which is a substantially flat portion disposable upon the top surface of the edge angle member 138 and which is overlapped by the overlapping plate portion 152C of the first termination plate 152A. The end edge of the pad portion 152E is crimped to form a tab 152F. Also, the medial portion of the first termination plate 152A is shaped to have a groove 152G in its underside, and the tab 152F is slidably received in the groove 152G. The second termination plate 152D also has a panel support portion 152H as shown.

The roof panels 18A which form the terminal row of roof panels along the terminal edges of the purlins 140 overlay the panel support portion 152H of the second termination plate 152D. A strip of tape sealant 160 is extended from eave to ridge along the top surface of the roof panels 18A just above the panel support portion 152H. A longitudinally extending termination member 162, having a lower flange 164, is set upon the sealant 160 and secured thereon via plural screw members 166 which extend through the roof panel 18A and attach to the underlying panel support portion 152H, sealingly squeezing the sealant 160 therebetween.

The termination member 162 is a light gage, zee-cross sectioned member having a web portion 168 extending upwardly from the lower flange 164 and having an upper support flange 170 extending generally parallel to the lower flange 164. Another strip of tape sealant 160 is extended from eave to ridge along the top surface of the upper support flange 170, and a sheet metal termination flange 172 is disposed to overlap same. The termination flange 172 has a flashing lower portion 174 configured to be disposed substantially flush against the end wall 16B and retained thereat via a rake flashing clip 176 attached via screw members 178 to the wall 16B. The termination flange 172 also has a flashing upper portion 180 which is configured to extend over the side lap portions 34 of the terminal row of roof panels 18A, a termination lip 182 of the flashing upper portion 180 disposed to overlap and attach to the upper support flange 170 of the termination member 162. A plurality of screw members 166 connect the termination lip 182 to the upper support flange 170 in sufficient tightness to be sealed by the tape sealant therebetween.

The discussion of termination trim 150A of FIG. 6C is premised on the circumstance that the pair of side lap portions of the terminal row of roof panels 18A are finally disposed at or near the terminal edges of the purlins 140 such that the termination flange 172 will cover such. In practice, the final disposition of the side lap portions 34 can vary widely, and can in fact extend beyond the envelope interior of the termination flange 172 as discussed above for FIG. 6B, in which case the roof panel 18A is field-cut such that its newly formed terminal edge falls within the interior envelope of the termination flange 172. This condition is not illustrated for the termination trim 150A in the figures as it is believed the above discussion for the termination trim 150 and FIG. 6B will make this clear. In the condition described, it is a simple adjustment to rotate and locate the first termination plate 152A at the outer edge of the edge angle member 138, and to secure the termination member 162 to the underlying panel support portion 152H as before described. Also, the flashing upper portion 180 is trimmed back as required so that the termination lip 182 is just disposed over the upper support flange 170 and the tape sealant 160, and is attached via the screw members 166.

Another feature of the present invention is an improved utility opening assembly which will now be described. The roof system 10 which has been described above is constructed of plural standing seam roof panels designed to interlock so as to provide secure, watertight gasket seals along the overlapping side portions. A legend for the following figures is found in FIG. 7 which is a perspective of the roof panels as they will appear after being installed. These roof panels are sealed by known sealing techniques at end overlapping areas of the roof panels, so that, with the side lap sealing described above, a watertight seal is provided from side wall to side wall and from end wall to end wall. In providing openings in roof assemblies of the type described herein, various prior art construction techniques have been devised, most, if not all, of which involve providing openings prior to the installation of the roof panels. That is, for example, it is normal practice for a skylight installing crew to install their skylight assemblies prior to the work of the roof panel crew, or alternatively, to stop the roof panel crew periodically while installing the skylight assemblies just ahead of where the roof panel installation has proceeded. In contrast to such prior art techniques, the present invention provides for uninterrupted roof panel installation while permitting utility opening assembly installation to proceed anytime subsequent to the roof panel installation completion. While the utility opening assembly of the present invention will be illustrated by a description of a skylight assembly installation, it is to be understood that the utility opening can be used for other functions as, for example, roof mounted electrical assemblies and air conditioners.

The arrow in FIG. 7 depicts a typical location of a skylight assembly 190 constructed in accordance with the present invention and which is described immediately following. The skylight assembly 190 comprises a translucent panel installed over a pair of skylight openings which provide for light communication to the interior of the building structure. The components of the skylight assembly 190 and the sequence of installing steps will now be described.

If an opening is desired in a roofing system such as depicted by the arrow location 190 of the legend view of FIG. 7, it should be made in the middle portion of the roof panel and positioned to miss the end lap area and the underlying purlins or other supporting building structural members. Since the end lap areas of the roof panels are usually disposed over purlins or joist, avoiding the end lap areas will usually serve the latter mentioned goal as well. Openings in roof panels should be supported with a backup framework to ensure strength throughout the interrupted portions of the roof panels. FIGS. 8A-8E illustrate the unique manner by which this is performed in the present invention.

In FIG. 8A, several of the clip assemblies 70 are shown extending upperwardly through the insulation 112 and hooked over the male side lap portion 34 of the roof panel 18 from the last completed run. At this point, assuming that the next roof panel to be installed has been selected to bear the skylight openings, a backup frame 192 is placed over the insulation blankets 112 and supported by the underlying purlins 140.

The backup frame 192 comprises a longitudinally extending planar frame member 194 which has a pair of cut out holes 196 that will serve as skylight openings once installation has been completed. The frame member 194 is caused to be disposed such that the holes 196 will reside between underlying roof support members which, in FIG. 8A, are the purlins 140. Spaced apart strengthening ribs 198 are disposed to extend downwardly along the longitudinal sides of the frame member 194 (as shown for one side only). The profile and size of the frame member 192 is determined to conform to the underside of the flat medial pan portion of the roof panel 18 so that the frame member 192 serves as a backup support for the roof panel 18 which will be placed thereover.

With the skylight assembly 190, roof openings need not be cut into the roof during installation of panel runs. Rather, the openings can be cut anytime after the installation of the roof has been completed. The backup frame 192 serves the necessary function of providing a strong beam to compress sealant as well as to predefine the skylight openings. The skylight assembly 190 is designed to allow the erector to proceed with the installation of panels without stopping the paneling operation to install it. Once the backup frame 192 is positioned, then normal roof paneling can proceed and the openings in the roof panels can be cut any time later.

When the erector comes to a predetermined panel which is to be fitted with a pan-type skylight, he must first position the backup frame over the purlins. After the backup frame 192 is positioned, the panel run is completed by placing the next roof panel 18 over the backup frame 192 and secure this newly placed roof panel with the already in place roof panels, and roof clip assemblies 70 are installed as necessary to secure the newly placed roof panel, following which, panel installais continued as before. However, it is suggested that the medial pan portion 38 of the roof panel placed over the backup frame 192 be marked so as to identify the approximate located of the center of each of the window openings 196. These markings, performed in any convenient fashion, will aid the skylight installation crew to later locate the backup frame 192.

When the skylight crew starts to complete skylight installation, the first step is to mark the roof panel 18 immediately above the backup frame 192 with reference liner 200 that outline the backup frame window openings 196, as shown in FIG. 8B. Since the locations of these window openings were previously marked by the paneling crew, it is an easy matter to find the exact outline of the window openings by lightly stepping on the medial portion of the roof panels directly over these openings; this will cause the edges of the backup frame 192 around the window openings to become visible. Using a felt tip marker, for example, and a straight edge, the reference lines 200 can be marked at about a quarter inch from the perimeter of the backup frame window openings 196. The reference lines 200 will indicate where to cut and remove the panel flat sections 202. Once the panel flat sections 202 are cut and discarded, an insulation section 112A of the insulation blanket 112 should be cut and removed, carefully avoiding cutting its underlying vapor barrier 204.

After the insulation section 112A of the blanket installation 112 is removed, leaving the vapor barrier 204 intact, it is suggested that the rough-cut edges of the openings be treated as follows. A sufficiently wide (about two inches) double-faced tape 206 is applied to the perimeters of the openings 196 (See FIG. 8C) only part (about one and one-half inches) of the tape's width is applied to the top of the panel. The remaining part (about one-half inch) is wrapped around the cut edges of around the openings left by the discarded panel flat sections 202, with the wrapped around portion of the tape being pressed to adhere to the panel underside.

Figure 8C:
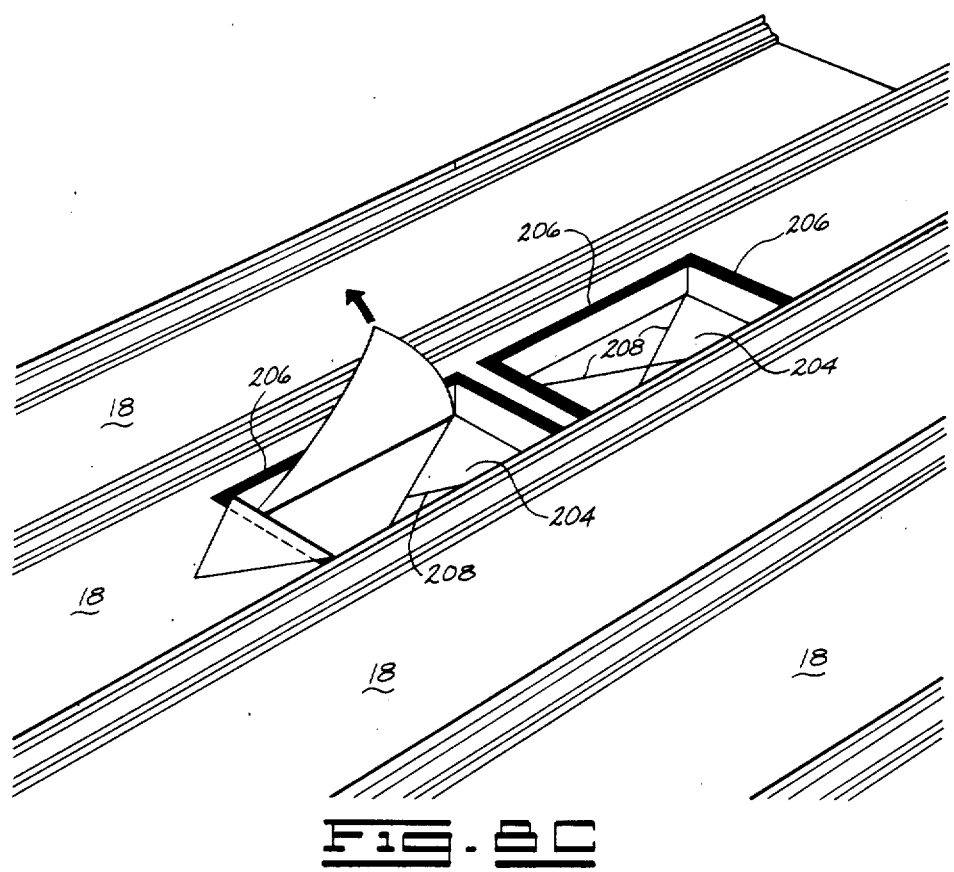
Figure 8D:
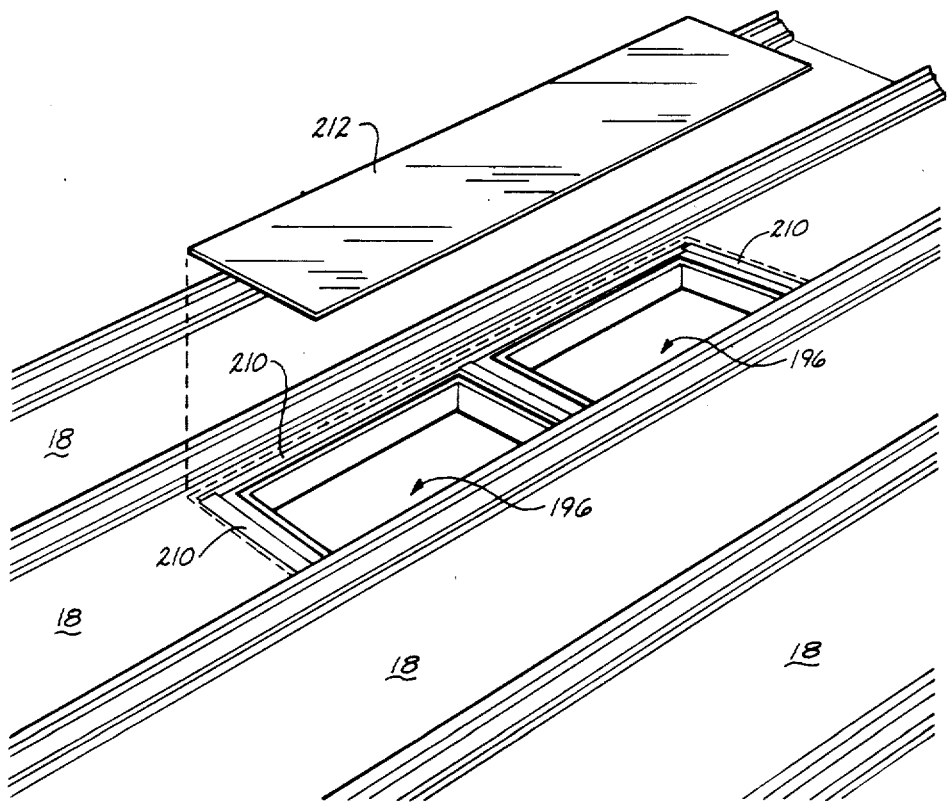

Next, the exposed vapor barrier 204 is cut from corner to corner of the openings as indicated by the vapor barrier cut lines 208. Then the cut triangular sections of the exposed vapor barrier 204 is pulled up and over the double faced tape 206, and these portions of these triangular sections extending beyond the tape sections 206 are cut and the scrap pieces discarded. Facing repair tape 204A is applied on the vapor barrier 204 at the corners where the vapor barrier does not cover the insulation material edges as shown in FIG. 8D. A strip of tape sealant 210 is placed around the window openings 196 and a unitary sheet of translucent plastic pane 212 is placed over the window openings 196 onto the tape sealant 210 so as to adhere and seal the pane 212 in place.

FIG. 8E is a semi-detailed depiction of a cross section across one of the window openings 196 showing the translucent pane 212 in place over the tape sealant 210. The border of the translucent pane 212 is outlined by a plurality of framing members 214 that are secured to the underlying backup frame 192 via appropriate screw fasteners 216 spatially disposed therealong. The framing members 214 are preferably angle members having upwardly extensive leg portions 218 which serve as beam strengtheners to assure compression retention against the translucent pane 212 by the framing members 214 and fasteners 216. Opening flashing members 220 can be provided and supported by the purlins 140, if desired, to make an attractive border about the openings in the insulation 112.

Turning now to a further discussion of criteria which must be considered in the design of snap together, standing seam panels, such as those described herein above, it should be noted that in snap-together panels there are some critical dimensions that control the interlocking of the panels as they are snapped together. These dimensions need to be maintained with very precise tolerances within the order of about 0.02 inch. Panels are roll formed from coiled steel stock, and the edge condition of coils purchased in the United States varies within at least plus or minus 3/16 inch for coil width and camber, or out-of-straightness. In the past, panel design and roll tool design operated on the theory that one edge of the panel would become the gage edge and the other would be the designated tolerance edge. Using this past method, a metal sheet cut from the coil was jogged to one side of the roll former by a device called an entry guide table. This table's primary function was to index the gage edge of the panel against a bar and hold it there while it entered the roll former. This method worked well for panels not requiring the high degree of tolerance that snap-together panels require. The present invention involves both the design of the panel shape and the design of the roll forming equipment to accommodate the fabrication of a panel that does to need to have a gauge edge. The gage edge was eliminated from the present invention because camber in the sheet makes it very difficult if not impossible to maintain a gage edge in the neighborhood of about plus or minus 0.02 inch.

The panel design of the present invention involves locating all critical dimensions of the snap-together panel from specially formed radii (i.e., radii 63, 64 discussed above and depicted in FIG. 2) that are induced into the panel at the very first stand and through multiple stands of the roll former assembly utilized to form the roof panel 18. These radii are then maintained throughout the roll forming of the panel. This provides the means whereby the snap-together dimensions of the standing seam joint 30 can be held to within about plus or minus 0.02 inch. In order to accomplish this the roll former is designed so that there are no gage edges to the sheet. Each edge of the sheet is considered a tolerance run-out edge. The entry guide table then simply directs the metal sheet into the roll former such that there is some excess materials on either side of the panel which become the free legs 52, 60 of the side edges of the panels 18A and 18B as shown in FIG. 2 and described above. The coils as received from the supplying steel mill can vary in edge displacement within the usual plus or minus 3/16 inch without affecting the snap-together performance of the roll formed panels.

It is clear that the present invention is well adapted to carry out the objects and to attain the ends and advantages mentioned therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. A method of installing a utility opening assembly in a building roof assembly in which standing seam roof panels interlocked in side by side disposition over roof support structural members, comprising:
   placing a backup frame on the roof support structural members at a selected access opening location, the backup frame having at least one access opening therein;
   installing a roof panel over the backup frame in the progressive installation of the roof assembly by interconnecting the roof panel with adjacently disposed roof panels;
   removing a portion of the overlying roof panel at the access opening of the backup frame; and
   securing a utility member to the backup frame over the access opening to sealingly cover the access opening and to unitize the secured member to the overlying roof panel.

2. The method of claim 1 wherein the step of securing the utility member comprises:
   positioning an opening frame on the overlying roof panel to extend about the access opening; and
   attaching the opening frame to the underlying backup frame.

3. The method of claim 1 wherein the step of removing a portion of the overlying roof panel comprises:
   scoring the overlying roof panel at the access opening in the medial portion of the overlying roof panel by applying pressure on the upper surface of the medial portion to outline each access opening in the backup frame;
   cutting the medial portion of the roof panel along the scoring thereof; and
   removing the cut out portion to expose each access opening of the backup frame.

4. The method of claim 3 wherein the step of securing the utility member comprises:
   positioning an opening frame on the overlying roof panel to extend about the access opening; and
   attaching the opening frame to the underlying backup frame.

5. The method of claim 1 wherein the backup frame is placed such that each access opening in the backup frame is positioned between adjacent roof support structural members.

6. The method of claim 5 wherein the backup frame is configured to receive the overlying roof panel in nesting relationship.

7. The method of claim 1 wherein the utility member is a skylight assembly, and wherein the step of securing the utility member comprises:
placing a translucent member onto the overlying roof panel over the exposed access opening;
positioning an opening frame over the translucent member about the access opening; and
attaching the opening frame to the underlying backup frame so that the translucent member, opening frame and backup frame are secured in sealing engagement to the overlying roof panel.

8. A method of installing a skylight assembly in a building roof assembly in which standing seam roof panels interlocked in side by side disposition over roof support structural members, comprising:
placing a backup frame on the roof support structural members at a selected skylight window location, the backup frame disposed over the roof support structural members, and having at least one window opening therein;
installing a roof panel over the backup frame in the progressive installation of the roof assembly by interconnecting the roof panel with adjacently disposed roof panels, the backup frame configured to receive the overlying roof panel in nesting relationship, each window opening disposed to align within the medial portion of the overlying roof panel;
scoring the outline of each window opening in the medial portion of the overlying roof panel at a selected time by applying pressure on the upper surface of medial portion to outline each window opening therein;
cutting the medial portion of the roof panel with the scored outline of each window opening to expose the window opening;
positioning an opening frame over the roof panel to extend over each exposed window opening;
attaching the opening frame to the underlying backup frame; and
securing a translucent member over the opening frame to sealingly cover each window opening.

9. A method of installing a skylight assembly in a building roof assembly in which standing seam roof panels interlocked in side by side disposition and wherein blanket insulation is positioned between the roof panels and the roof support structural members, comprising:
placing a backup frame on the blanket insulation at a selected skylight window location, the backup frame having at least one window opening disposed between adjacent roof support structural members;
installing a roof panel over the backup frame so that the backup frame is freely disposed beneath a medial portion of the roof panel;
defining the outline of the window opening on the medial portion of the roof panel at a selected time by applying pressure on the upper surface of the roof panel to partially deform the roof panel medial portion over the window opening;
cutting the medial portion of the roof panel along the defined outline and removing a portion of the roof panel to expose the underlying window opening in the backup frame;
removing the insulation below the window opening;
placing a translucent member onto the roof panel over the window opening;
placing an opening frame member onto the pane member; and
attaching the opening frame member to the underlying backup frame to seal the window opening and to connect the backup frame against the underside of the roof panel.

* * * * *

UNITED STATES PATENT AND TRADEMARK OFFICE
CERTIFICATE OF CORRECTION

PATENT NO. : 4,682,454

DATED : July 28, 1987

INVENTOR(S) : Harold G. Simpson and Leo E. Neyer

It is certified that error appears in the above-identified patent and that said Letters Patent is hereby corrected as shown below:

In column 8, line 28, the word "slip" should read --clip--. In column 16, line 30, the word "lais" should read --lation is--.

Signed and Sealed this

Twenty-first Day of June, 1988

Attest:

DONALD J. QUIGG

*Attesting Officer*   *Commissioner of Patents and Trademarks*